Sept. 2, 1969 A. M. SCANDURRA 3,465,255

ENVIRONMENTAL CONTROL FOR RADIO FREQUENCY RECEIVING SYSTEMS

Filed Feb. 16, 1966 2 Sheets-Sheet 1

INVENTOR
ALDO M. SCANDURRA
BY
ATTORNEY

INVENTOR
ALDO M. SCANDURRA
BY
ATTORNEY

United States Patent Office 3,465,255
Patented Sept. 2, 1969

3,465,255
ENVIRONMENTAL CONTROL FOR RADIO FREQUENCY RECEIVING SYSTEMS

Aldo M. Scandurra, Greenlawn, N.Y., assignor to Applied Research, Inc., Port Washington, N.Y., a company of New York Filed Feb. 16, 1966, Ser. No. 527,862
Int. Cl. H04b *1/06*
U.S. Cl. 325—462 10 Claims

ABSTRACT OF THE DISCLOSURE

A radio frequency environmental control system for sensing energy levels within incremental portions of the radio frequency spectrum and utilizing the sensed energy levels to control the amplitude of any selected signal or group of signals in a selected manner to control a radio frequency environment.

This invention relates to environmental control for radio frequency receiving systems and more specifically to a novel and improved method and apparatus for attenuating precise portions of selected parts of the radio frequency band which have signal strengths above arbitrary levels.

With the vast increase in the use of radio frequency for communications, telemetering, equipment control and the like, it has been found that strong signals often seriously interfere with the reception of weaker signals on adjoining frequencies. This is particularly evident in cases where transmitters are located near receiving antennas, and transmission and reception must be carried out simultaneously.

The foregoing difficulties are overcome with the novel and improved system in accordance with the invention which may be arranged to control the incoming signals either manually or automatically to limit the maximum amplitude of any selected signal or group of signals uniformly or in a selected manner. In this way the radio frequency environment may be precisely controlled in any desired manner and with exceedingly fast time constants.

Another object of the invention resides in the provision of a novel and improved method for controlling the amplitude of signals within a selected portion of the radio frequency spectrum.

Still another object of the invention resides in the provision of a novel and improved radio frequency environmental control apparatus that may be operated manually, automatically or in accordance with a selected computer controlled program to fix the level of signals entering a receiving system.

Still another object of the invention resides in the provision of a novel and improved radio frequency environmental control system.

The above and other objects and advantages of the invention will become more apparent from the following description and accompanying drawings forming part of this application.

Figure 1:
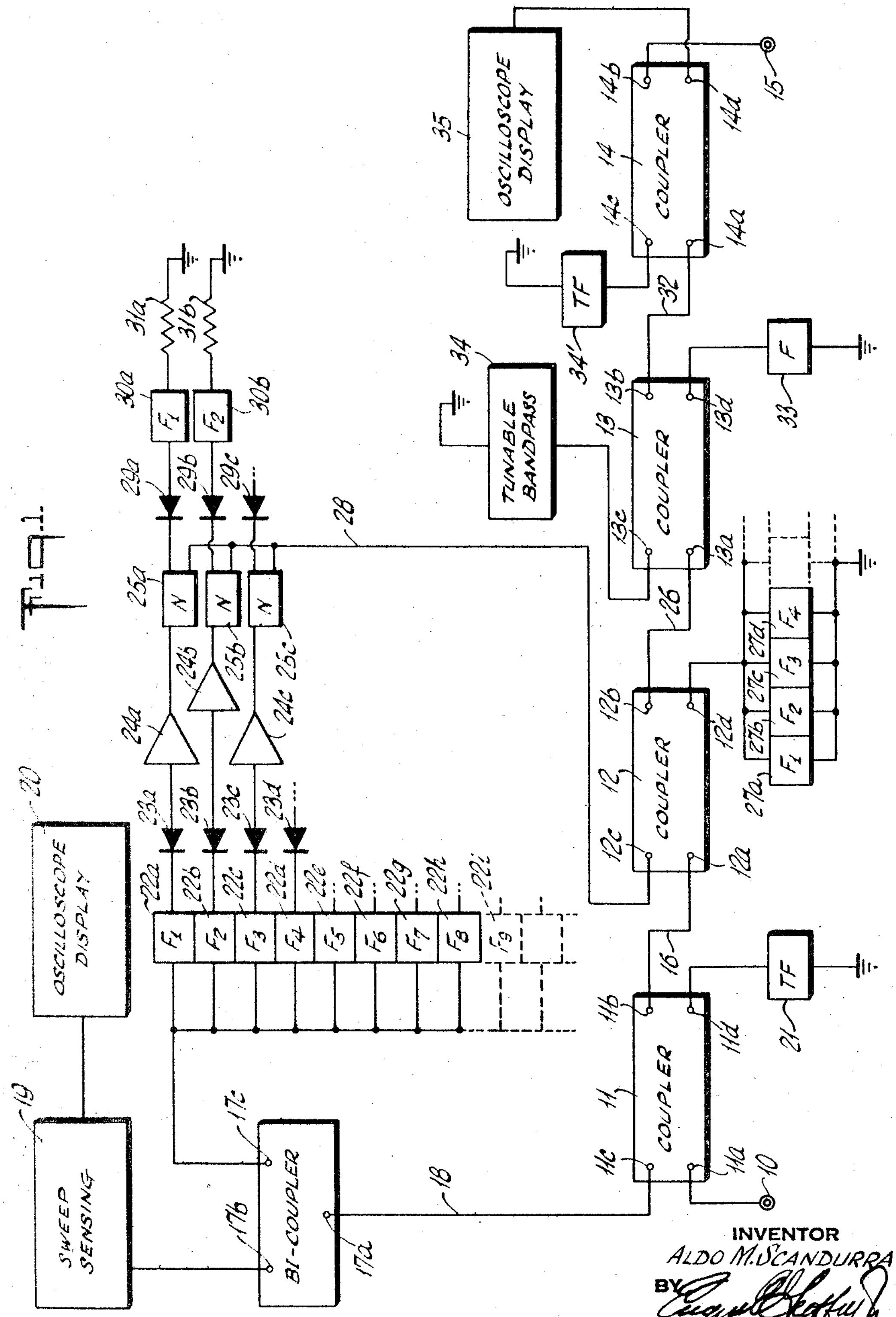
FIGURE 1 is a block diagram illustrating one embodiment of the invention arranged for automatic operation.

Referring now to the drawings, the numeral 10 denotes an input terminal to which a band of radio frequency energy is fed from a suitable source such as an antenna, radio frequency amplifier or the like. This energy is then fed through a series of couplers 11 to 14 and thence to the output terminal 15. As will be shown the couplers are arranged in a novel and improved manner to control the radio frequency energy fed to the output terminal 15 and thus provide a controlled radio frequency environment as viewed by a load connected to the output terminal. This procedure overcomes the serious difficulties heretofore encountered in communication complexes utilizing a multiplicity of transmitters and receivers and wherein substantial differences in signal levels are encountered which materially interfere with reception of signals and particularly signals which are close to the frequency of a local transmitter.

The initial coupler 11 may be of any suitable configuration such as a hybrid or a circulator. In the illustrated embodiment of the invention the couplers 11 to 14 are hybrid filters each having a main energy path and a control path, the latter serving either to sample the energy in the main path or to control the magnitude of all or selected frequencies of the energy in the main path.

More specifically the coupler 11 has a main input terminal 11*a* connected to the input terminal 10 and an output terminal 11*b* connected via lead 16 to the input terminal 12*a* of coupler 12. One control path terminal 11*c* is connected to the input 17*a* of bi-coupler 17 via lead 18, the latter having one output terminal 17*b* connected to a sweep sensor 19 and oscilloscope display 20. The other control path terminal 11*d* is connected via a terminating filter 21 to ground. Since the coupler 11 is used principally for sampling the radio frequency energy at the input terminal 10, the coupler 12 may be arranged with appreciable impedance to ground so that only a small proportion of the energy is fed to the bi-coupler 17 for visual presentation on the oscilloscope 20.

The bi-coupler 17 in addition to feeding the oscilloscope 20 feeds radio frequency energy from the terminal 17*c* to a plurality of filters 22*a*, 22*b* . . . etc., each of which is arranged to pass radio frequency energy in incremental portions of the total band fed to the input terminal 10. For instance the filter 22*a* may be tuned to pass a band of frequencies $F_1$ while the filter 22*b* may be tuned to pass the adjoining band of frequencies $F_2$. Successive filters cover successive sub-bands and sufficient filters are employed to cover the entire radio frequency band to be controlled. The output of each of the filters 22*a*, 22*b* . . . etc., is rectified by rectifiers 23*a*, 23*b* . . . etc., to produce DC output control voltages proportional in magnitude to the radio frequency voltages passing the filters 22*a*, 22*b* . . . etc. These voltages may then be amplified by suitable DC amplifiers 24*a*, 24*b* . . . etc., and then fed to control devices N denoted by the numerals 25*a*, 25*b* . . . etc., which are interconnected with the energy control coupler 12.

The energy control coupler 12 has its output terminal 12*b* connected via lead 26 to the coupler 13 and one of its control terminals, namely 12*d*, to a plurality separately tunable parallel connected band pass filters 27*a*, 27*b* . . . etc. These filters are each tuned to the same incremental portions of the band as are the filters 22*a*, 22*b* . . . etc., and for convenience filters tuned to the same frequency are denoted by the letter F followed by the same subscript. Thus all filters tuned to one frequency increment are denoted by $F_1$ and so forth.

The terminal 12*c* of coupler 12 is connected by lead 28 to each of the control devices 25*a*, 25*b* . . . etc., each of which may comprise a variable impedance device wherein the impedance can be varied by the application of a DC potential. Such a device may be an ordinary transistor or other similar device with suitable circuitry. Each control device 25*a*, 25*b* . . . etc., may then be connected by a rectifier 29*a*, 29*b* . . . etc., to filters 30*a*, 30*b* . . . etc., and resistors 31*a*, 31*b* . . . etc., to ground.

With the foregoing arrangement, the filters 22 each sense the energy level in its increment of the total band and the signals are used to control the effectiveness of the filters 30 to reduce or modify the signal level in each increment by the removal of energy from the control coupler 12. The amount of energy removed can be controlled for instance by the gain of amplifiers 24 or other suitable means and any desired form of control may be effected as will be described.

In certain cases it may be desirable to afford some form of manual control to effect increased attenuation or possibly complete removal of a selected signal and for this purpose the coupler 13 may be employed. With this coupler, the controlled radio frequency energy is fed to the main input terminal 13*a* while the main output terminal 13*b* is connected via the lead 32 to the main input terminal 14*a* of coupler 14. The control terminal 13*d* is connected through a broad band filter 33 to ground while the control terminal 13*c* is connected through the tunable band pass or micronotch filter 34 to ground. By making the filter 34 relatively narrow, it can be tuned throughout the band of frequencies fed to terminal 10 and thus further attenuate any selected frequency or band of frequencies as the case may be.

Inasmuch as it is desirable to monitor the entire frequency range after the control has been effected, the fourth coupler 14 is employed. As pointed out above the controlled energy is fed to the main input terminal 14*a* while the main input terminal 14*b* is connected to the output terminal 15 to which the receiver or other load is connected. The control terminal 14*c* is connected via the terminating filter 34' to ground while the terminal 14*d* is connected to the display oscilloscope 35.

With the apparatus described above, automatic control of the radio frequency environment of a receiver or other load is accomplished. Under certain conditions it is of course possible merely to use the couplers 11 and 12, and it is understood that the oscilloscopes 20 and 35 are merely used to monitor the operation of the system. In certain applications it may not be desirable to provide automatic control of the environment in which instance the control can be effected manually as illustrated in FIGURE 2.

Figure 2:
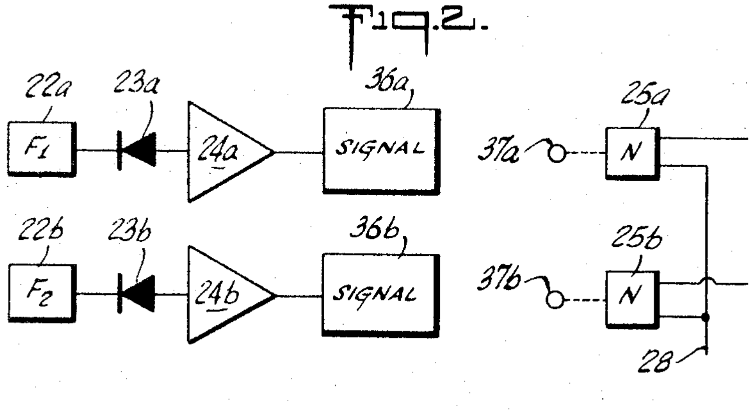
FIGURE 2 is a block diagram of a modification of the embodiment of the invention shown in FIGURE 1.

The circuit shown in FIGURE 2 utilizes a number of components corresponding to the components of FIGURE 1 and like components of both figures are therefore denoted by like numerals. In FIGURE 2 the amplifiers 24*a*, 24*b* . . . etc., are connected to individual signal devices 36*a*, 36*b* . . . etc., which might provide either audible or visual signals for an operator. The visual signal may be in the form of an oscilloscope or even a simple light source. The control devices 25*a*, 25*b* . . . etc., would be individually operated by suitable controls 37*a*, 37*b* . . . etc., and these controls may be either an on-off switch or a suitable variable control so that any degree or attenuation of selected increments of the band can be effected.

Figure 3:
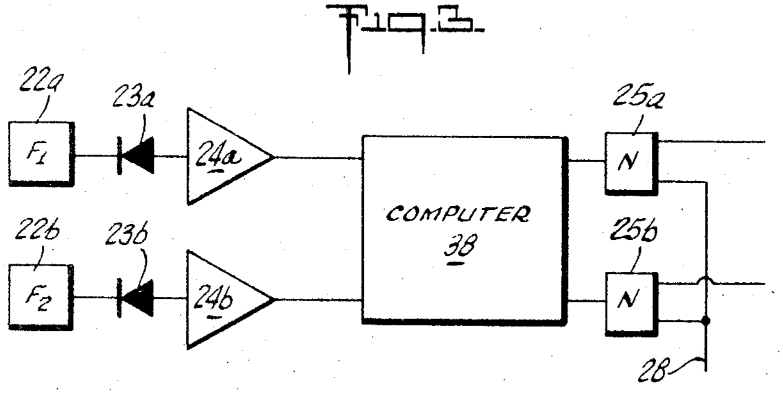
FIGURE 3 is a block diagram of a further modification of the invention shown in FIGURE 1.

In certain applications, it may be desirable to provide a system of control wherein the degree of attenuation of the several increments of the total band are related in a predetermined manner or in the alternative attenuation of the incremental band portions may need to be related to a particular transmitting and receiving schedule. For this purpose the modification shown in FIGURE 3 may be utilized. In this figure a computer 38 receives signals from the amplifiers 24*a*, 24*b* . . . etc., and functions to operate the control networks 25*a*, 25*b* . . . etc. The computer may take any suitable form, and may be programmed to provide a selected mode of control of each increment of the entire RF band being fed to the receiver or other load connected to the output terminal 15 as shown in FIGURE 1.

Figure 4:
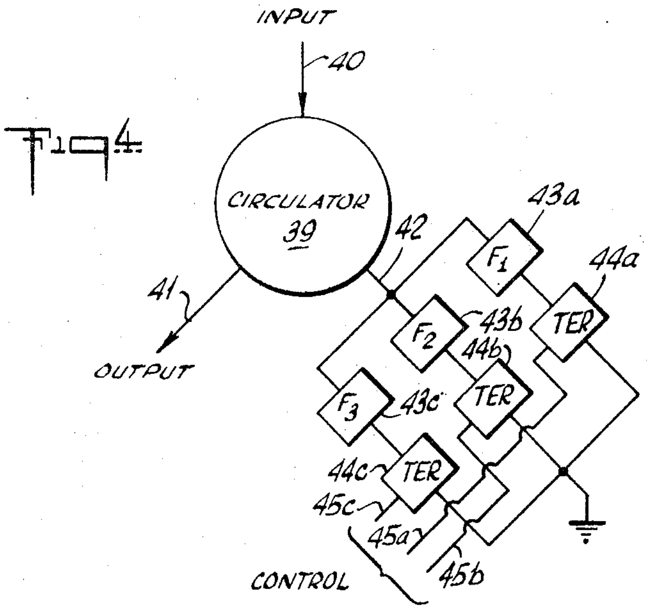
FIGURE 4 illustrates a modified form of coupler for use with the invention illustrated in FIGURES 1 through 3 inclusive.

As previously pointed out the couplers 11 through 14 of FIGURE 1 may either be hybrid filters or they may be in the form of circulators, one of which is shown in FIGURE 4. When utilizing a circulator in place of the hybrid coupler 12 for instance, the lead 16 would be connected to the input 40 of the circulator 39 while the lead 36 would be connected to the output 41 of the circulator. The control terminal 42 may include any suitable filter arrangement for removing energy from the circulator in select incremental portions of the band. One procedure for the attainment of this end is to provide a plurality of filters 43*a*, 43*b* . . . etc., which in effect would correspond to the filters 27 and 30 of FIGURE 1. Variable impedance devices 44*a*, 44*b* . . . etc., would connect each of the filters 43*a*, 43*b* . . . etc., to ground. The variable impedance devices would then be operated by suitable control signals applied to the leads 45*a*, 45*b* . . . etc., these signals being obtained essentially from devices such as the amplifiers 24*a*, 24*b* . . . etc.

While only certain embodiments of the invention have been illustrated and described, it is apparent that alterations, modifications and changes may be made without departing from the true scope and spirit thereof as defined by the appended claims.

What is claimed is:

1. A radio frequency environmental control system operable over a selected portion of the radio frequency spectrum comprising a circuit for feeding radio frequency energy to a load, a plurality of sensing means coupled with said circuit to sense radio frequency energy levels in incremental portions of the band passed by said circuit, a plurality of control means each one being individually connected to and actuated by a corresponding one of said plurality of sensing means, and electrical connections between each of said plurality of control means and said circuit whereby said plurality of control means automatically control said circuit in accordance with energy levels sensed by said plurality of sensing means.

2. A radio frequency environmental control system according to claim 1 wherein said control means includes means to selectively control said energy levels.

3. A radio frequency environmental control system comprising a radio frequency signal input terminal, a plurality of band pass filters each connected to said input terminal and producing a signal related to the magnitude of the radio frequency energy passed by said filter, a radio frequency energy controlling coupler having an input, output, and control terminal, a connection between the input of said coupler and said input terminal, a plurality of terminating filters connected so said control terminal, said terminating filters being tuned to frequency bands corresponding to said band pass filters, and means connected with each of said terminating filters to vary the effectiveness thereof whereby the radio frequency energy level appearing at said output terminal in any selected portion of the radio frequency spectrum as determined by said band pass filters may be controlled by operation of the last said means in accordance with said signals.

4. A radio frequency environmental control system comprising a radio frequency signal input terminal adapted to receive signals within a predetermined band in the radio frequency spectrum, a plurality of narrow band pass filters each connected to said input terminal with each of said filters passing radio frequency energy in a different portion of said band, a radio frequency energy controlling coupler having an input terminal, an output terminal and at least one control terminal, a plurality of terminating filters connected to said control terminal, each of said terminating filters being tuned to pass energy in the portion of the spectrum passed by a band pass filter and including a variable impedance device operable to control the affect of its associated filter on the energy passed by coupler, a connection between the input terminal of said coupler and the first said input terminal means connecting each of said band pass filters with a terminating filter whereby the impedance of said variable impedance means of each of said filters is modified in accordance with the signal level passed by its associated band pass filter.

5. A radio frequency environmental control system operable over a selected band of the radio frequency spectrum comprising a circuit including at least two couplers for feeding radio frequency energy to a load, a plurality of band pass filters each tuned to pass an incremental portion of said band, connections between each of said filters and one of said couplers to feed a portion of the energy entering said one coupler to said filters, said filters producing signals related to the energy levels in said incremental portions of the band, and a plurality of individual terminating filters connected to the second of said couplers each of which is tuned to pass an incremental portion of said band corresponding to one of said band pass filters, said terminating filters each including variable impedance means operable to modify the effectiveness of said terminating filters and to selectively control the energy level in each increment of the band fed to said load.

6. A radio frequency environmental control system operable over a selected band of the radio frequency spectrum according to claim 5 including individual circuit means connecting each of said band pass filters with one of said terminating filters whereby the last said control means are actuated by said band pass filters and automatically control the signal levels in each increment of said band fed to the load.

7. A radio frequency environmental control system according to claim 6 wherein the last said control means includes a computer.

8. A radio frequency environmental control system according to claim 5 wherein the first said circuit includes a third coupler for controlling the energy level fed to said load and a tunable band pass filter connected to said third coupler.

9. A radio frequency environmental control system according to claim 6 including means visually indicating signal levels in said band entering the first coupler and means visually indicating signal levels in said band being fed to said load.

10. A radio frequency environmental control system operable over a selected band of the radio frequency spectrum according to claim 5 including individual voltage responsive control means connecting each band pass filter with one of said terminating filters, each of said control means varying the impedance means of its associated terminating filter to render the latter effective to attenuate the signals in an incremental portion of the band when the incoming signal level of the last said incremental portion exceeds a predetermined magnitude.

References Cited

UNITED STATES PATENTS

| | | | |
|---|---|---|---|
| 1,915,483 | 6/1933 | Beers | 325—477 XR |
| 2,255,645 | 9/1941 | Bligh | 325—427 |

KATHLEEN H. CLAFFY, Primary Examiner

BARRY PAUL SMITH, Assistant Examiner

U.S. Cl. X.R.

325—465